3,339,677
BRAKE SPIDER AND SHOE ASSEMBLY
Arnold F. Behnke, Rosemead, Calif., assignor to Kay-Brunner Steel Products, Inc., Los Angeles, Calif., a corporation of Delaware
Filed Aug. 10, 1964, Ser. No. 388,656
1 Claim. (Cl. 188—78)

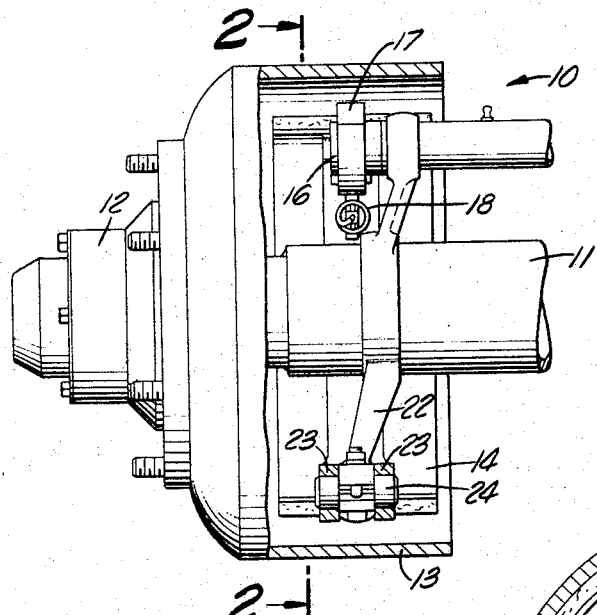
FIG. 1.
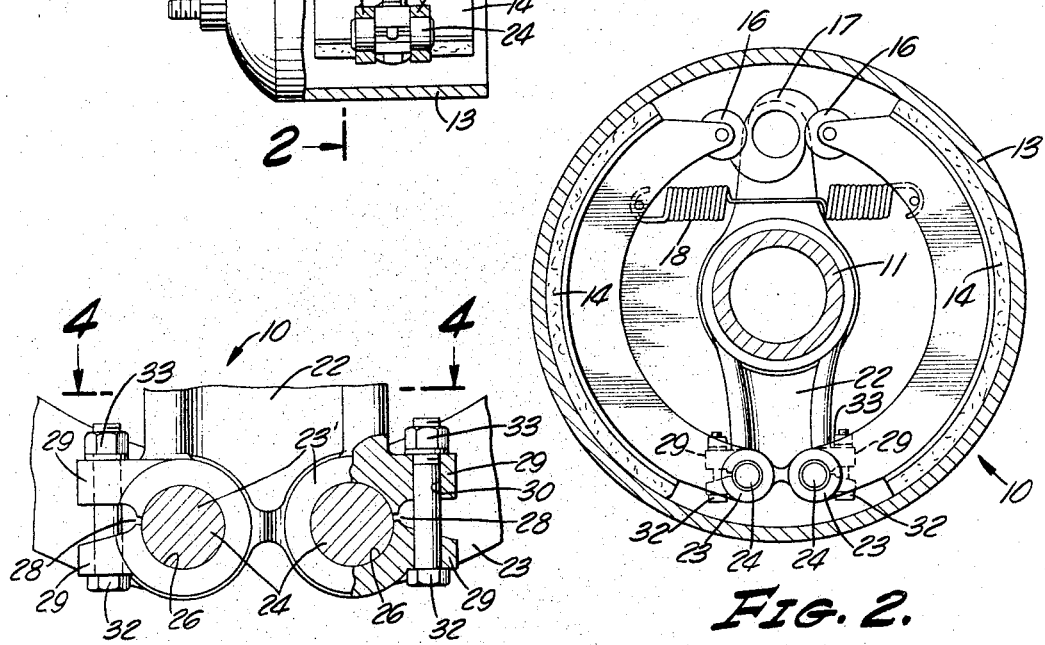
FIG. 3.
FIG. 2.
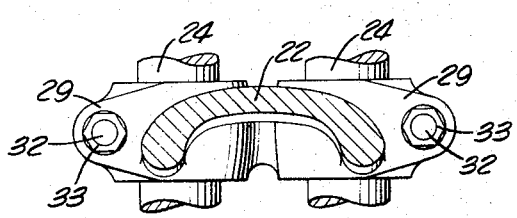
FIG. 4.
ARNOLD F. BEHNKE
INVENTOR.
ATTORNEY United States Patent Office 3,339,677
Patented Sept. 5, 1967

This invention relates to improvements in braking mechanisms, and more particularly to a heavy duty brake assembly having improved and superior means of a simple but highly effective nature for releasably locking one end of each brake shoe pivotally assembled to supporting bracket arm means.

Braking assemblies for motor vehicles, particularly heavy duty vehicles, are subjected to unusually heavy strains and abusive treatment. Space for the operating components is at such a premium that it is not uncommon for the components to be designed very close to the ultimate load strength of the materials employed. This does not leave any margin for error and more particularly tolerance variations or looseness occurring through wear for deformation of the parts during service life increases the likelihood of breakdown and failure of the braking system at a critical time when it is most urgently needed.

One of the areas which is particularly critical is the pivot connection between brake shoe anchor and the pivoting end of the brake shoes. It is customary practice to mount these bracket or anchor arms on the axe housing and to provide a pivot pin connection between this arm and the brake shoes. Tremendous load forces must be transmitted by these pivot pin connections. If the pins have a close tolerance fit with the brake shoes and particularly with the supporting bracket structure and if adequate foolproof clamping means are provided, such pins can be relied upon with a minimum of risk. However, a serious problem is presented in providing proper means for clamping the pins to the supporting bracket and yet having adequate provision for releasing the pins when it is desired to disassemble the components for servicing and the replacement of parts.

The clamping means heretofore provided for this purpose are subject to numerous disadvantages and shortcomings sought to be overcome and avoided by the present invention. For example, it has been proposed to employ set screws mounted in the bracket arm and acting when tightened to force the pivot pin into frictional engagement with the opposite side of the mounting opening for the pin. The opposite half of the pin facing toward the set screw is unavoidably forced out of contact with the juxtaposed wall of the opening leaving the pin free to tilt and twist about the end of the set screw acting as a fulcrum. Furthermore the pin, at best, is but weakly clamped in place and is likely to become partially or fully loose after a short period of braking operation. This is particularly true upon expansion of the parts as the brakes become heated in use.

It has also been proposed to provide the portion of the anchor arm between the pin mounting openings with a connecting slot and to use a clamping bolt to draw the opposite sides of this slot together thereby forcing the walls of the openings into firm locking engagement with the pivot pins. This expedient has been found to be quite beneficial and to be a decided improvement over the use of set screws but it too is subject to disadvantages. Casting of the bracket arm is complicated by the presence of this slot and the need for an opening to receive the clamping bolt. In addition, provision must be made at the inner end of this bolt opening to accommodate the clamping nut for the bolt. Additionally the tightening of this adjusting nut is awkward and difficult to carry out because of the cramped quarters in which it is located and the fact that a wrench cannot easily be applied to the adjusting means; even then the wrench cannot be rotated through more than a very small arc. Additionally, loosening of this single bolt acts to release both pivot pins which is undesirable, since, normally, only one pin is in need of service at any one time.

By the present invention there is provided a simple, rugged and inexpensive means avoiding the above enumerated and other deficiencies and disadvantages. To this end, the unitary bracket casting of this invention employed to support the pivot end of the brake shoes has separate large area openings for the pins supporting the respective ends of the brake shoes. Each pin seating opening is provided with a narrow slot opening radially therefrom and located along the opposite lateral edges of the bracket arm. Each slot includes a pair of ears integral with the anchor arm and located to either side of the slot and projecting outwardly from the opposite lateral edges of the arm. These ears are provided with aligned openings to receive separate adjustable bolts effective, when tightened, to clamp the midlength portion of the pivot pins throughout their circumference and in a very powerful manner even when highly heated under severe and prolonged braking operations.

The brake shoes themselves have bifurcated ends of a width just sufficient to straddle the portion of the bracket arm provided with the pin openings. These bifurcated ends have aligned openings to receive the cylindrical headless pivot pins which, due to the absence of a head, can have either end inserted in either direction through the aligned openings. These pivot pins are accurately made to have a snug press fit with the openings with the result that, upon tightening of the clamping bolts, the pins are clamped very rigidly throughout their circumference thereby locking the brake shoes pivotally assembled to the bracket arm. Each of the adjustable clamping means is readily accessible interiorly of the brake shoes for adjustment and each controls the pivot pin for its own individual brake shoe with the result that servicing of one brake shoe does not interfere or upset the operation arrangement or adjustment of the other shoe.

Accordingly it is a primary object of the present invention to provide an improved braking mechanism for vehicle wheels featuring, in particular, an improved high-strength high-reliability and high-efficiency means for releasably anchoring each brake shoe pivotally assembled to a supporting bracket.

Another object of the invention is the provision of a brake shoe supporting bracket having separate means for rigidly and immovably locking separate brake shoes pivotally assembled thereto.

Another object of the invention is the provision of an improved braking mechanism utilizing a single clamping nut supported in a bracket arm for the brake shoes and effective when tightened to clamp the midportion of the brake shoe pivot pin immovably in place.

These and other more specific objects will appear upon reading the following specification and claims and upon considering in connection therewith the attached drawing to which they relate.

Referring now to the drawing in which a preferred embodiment of the invention is illustrated.

FIGURE 1 is a fragmentary side elevational view of a preferred embodiment of the invention, portions of the parts being broken away to show constructional details;

FIGURE 2 is a cross-sectional view taken along line 2—2 on FIGURE 1;

FIGURE 3 is an enlarged fragmentary view of the pivot pin anchor means with parts broken away to show details; and FIGURE 4 is a cross-sectional view taken along line 4—4 on FIGURE 3.

Referring to the drawing, there is shown a preferred embodiment of the invention incorporated in a typical vehicle braking mechanism designated generally 10. The carriage axle, not shown, is enclosed in the usual tubular housing 11, the opposite ends of the axle being fixed to wheel hub means 12 each equipped in the usual manner with cylindrical brake drums 13. Located within this drum are a pair of brake shoes 14. As here shown, one pair of shoe ends is provided with rollers 16, 16 bearing against the opposite sides of a brake shoe actuator commonly known as an S-cam 17, the rollers being held pressed against this cam by a strong tension spring 18 having its ends connected to the respective brake shoes in the manner shown in FIGURE 2.

The opposite ends of the brake shoes are each bifurcated to straddle a stationary bracket arm 22 welded or otherwise rigidly secured to axle housing 11. It will be observed from FIGURE 1 that the bifurcated ends 23 of the brake shoes straddle this bracket arm and are pivotally connected thereto by a large diameter cylindrical pivot pin 24 lacking a head or flange on either end.

The means featured by this invention for holding these pivot pins and the brake shoes removably secured to the bracket arms will now be described with particular reference to FIGURES 1, 3, and 4. It will be understood that the outer end corners of bracket arm 22 are provided with a pair of oppositely facing C-clamps 23', 23' having large diameter openings 26. These openings have axes parallel to the axle and to one another and each C-clamp is provided with a cast-in narrow slot 28 extending throughout the length of the openings 26 and generally radially therefrom through the remote lateral edges of the bracket arm. Closely spaced along either side of these slots is a pair of ears 29 integral with the bracket casting and having aligned openings 30 to receive clamping bolt means 32. Each bolt is provided with an adjusting nut 33 located inwardly of the brake shoes and closely beside the edge of bracket arm 22.

From the foregoing it will be apparent that pivot pins 24 are preferably and conveniently cylindrical throughout their length and formed of specially high strength material owing to the very high load stresses imposed thereon by even normal braking operations. Since both ends are preferably free of enlargements, flanges or the like, they are adapted to be assembled in either direction through the aligned openings through the brake shoe and one of the bracket arm openings 26. Assembly is accomplished when the clamping bolts are in loosened condition following which the adjusting nuts 33 are tightened forcing ears 29 toward one another and constricting the walls of openings 26 against the side walls of the pivot pins throughout their circumference. This clamping action is of a highly efficient and very powerful character which remains effective throughout the life of the pins to hold them against rotation, axial movement, or twisting or bending within the bracket arm. Accordingly there is no opportunity for wear to occur between these surfaces and the assembly remains fully efficient and effective after long service as when first assembled. Since the opposite sides of the bifurcated brake shoes closely and snugly embrace the opposite ends of openings 26 there is no opportunity for these to twist or cant relative to the bracket casting with the result that the brake shoes are held in true concentricity with the brake drums.

Should it become desirable to renew the brake lining or to service the assembly for any reason requiring disassembly of the brake shoes, this operation is accomplished simply by loosening the clamping bolts following which the pivot pins are driven endwise out of assembled position. Thereupon the brake shoes are free for withdrawal from the brake drums. Reassembly is accomplished in the reverse manner and as described above.

While the particular braking mechanism herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claim.

I claim:

In a vehicle wheel braking mechanism of the type having a brake drum secured to a wheel, a pair of arcuate brake shoes disposed on diametrically opposed sides of the brake drum and provided with shoe actuating means operable to expand said shoes into high-pressure contact with said drum, that improvement which comprises a rigid brake shoe supporting bracket fixed to the vehicle axle housing with one arm thereof projecting generally radially from the axle housing between the opposite lateral edges of said brake shoes, the outer end of said arm extending between the bifurcated ends of said shoes, the opposite lateral edges of the outer end of said arm each having a pair of spaced-apart ears projecting outwardly therefrom and lying generally normal to the edges of said one arm, a large diameter cylindrical opening through each outer end corner of said one arm with their axes lying parallel to one another and to the axis of said brake drum, a slot opening radially throughout the length and along the remotely spaced sides of each of said cylindrical openings into the space between the associated pair of said ears, aligned openings through said pairs of ears lying normal to the plane of said slots and generally parallel to one another and the adjacent lateral edge of said one arm and each pair of aligned openings accommodating a separate clamping bolt and nut assembly for forcing the associated pair of said ears toward one another independently of the other pair of ears as the nut is tightened, separate cylindrical pivot pin means seated in said cylindrical openings with their midportions having a generally snug fit therein and their opposite ends extending outwardly through aligned openings in the bifurcated ends of an associated one of said brake shoes, the nuts of said separate clamping bolts being located on the inner end of said bolts, the space axially forward of said nuts being unobstructed and freely accessible to the open end of a socket-type wrench inserted past the inner radial portions of said brake shoes, and each of said bolt and nut assemblies being operable independently of one another as the same are wrenched to clamp and to unclamp the associated one only of said pivot pins without affecting the clamped or unclamped condition of the other of said pivot pins whereby each of said brake shoes can be installed, rigidly clamped and serviced entirely independently of the other brake shoe and its supporting pivot pin, and each of said pivot pins being clampable by its respective clamping bolt to the same degree of tightness despite substantial differences between the looseness of the pins in their respective openings before tightening their respective clamping bolts.

References Cited
UNITED STATES PATENTS 2,965,199   12/1960   Van Raden _____ 188—205 X DUANE A. REGER, *Primary Examiner.*